Sept. 26, 1961　　　F. R. WERNER ET AL　　　3,001,695
TOTALIZER CONTROLLING MECHANISM FOR CASH
REGISTERS AND ACCOUNTING MACHINES
Filed April 14, 1955　　　　　　　　　　　　3 Sheets-Sheet 2

INVENTORS
FRANK R. WERNER &
WALTER G. STERZER
BY
THEIR ATTORNEYS

Sept. 26, 1961  F. R. WERNER ET AL  3,001,695
TOTALIZER CONTROLLING MECHANISM FOR CASH
REGISTERS AND ACCOUNTING MACHINES
Filed April 14, 1955  3 Sheets-Sheet 3

INVENTORS
FRANK R. WERNER &
WALTER G. STERZER
BY
THEIR ATTORNEYS

United States Patent Office 3,001,695
Patented Sept. 26, 1961

3,001,695
TOTALIZER CONTROLLING MECHANISM FOR CASH REGISTERS AND ACCOUNTING MACHINES
Frank R. Werner and Walter G. Sterzer, Dayton, Ohio, assignors to The National Cash Register Company, Dayton, Ohio, a corporation of Maryland
Filed Apr. 14, 1955, Ser. No. 501,226
10 Claims. (Cl. 235—8)

The present invention relates to cash registers and accounting machines, and is particularly directed to mechanism to control the operation of such machines.

The machine chosen to illustrate the present invention is small, compact, and efficient, which makes it particularly suitable for use in connection with comparatively small business concerns, such as filling stations, dry cleaning establishments, drug stores, groceries, beauty shops, and analogous businesses.

It is an object of this invention to provide improved and simplified means for control of a machine of the above character.

Another object is the provision of means for automatically conditioning the machine for item transactions when amounts are entered in the machine and no transaction controlling key is depressed.

Another object is the provision of means operable by depression of an amount key to retain the transaction differential slide against movement unless a transaction key is also depressed.

Another object is the provision of means to cause the machine to perform an automatic item sub-total operation subsequently to a previous item entering operation.

Another object is the provision of means operable by the totalizer selecting mechanism to control the positioning of the transaction differential slide so as to condition the machine for a subsequent automatic Sub-Total operation.

Another object is the provision of means to cause the machine to effect an automatic No Sale operation, when the item totalizer is in a zeroized condition.

Another object is the provision of means to lock certain of the transaction keys against depression until an amount has been entered in the item totalizer.

Another object is the provision of means operable by the totalizer selecting mechanism to lock certain of the transaction keys against depression when the item totalizer is not selected for actuation.

With these and incidental objects in view, the invention includes certain novel features of construction and combinations of parts, a preferred form or embodiment of which is hereinafter described with reference to the drawings which accompany and form a part of this specification.

DESCRIPTION

The machine chosen to illustrate the present invention is a small, compact and efficient cash register or accounting machine of the type disclosed in the United States Letters Patent No. 2,443,652, issued June 22, 1948, to Edward J. Carey et al.; in United States Patent No. 2,450,165, issued September 28, 1948, to Harold O. Randall et al. and in the co-pending application of Frank R. Werner and Walter G. Sterzer for Letters Patent of the United States, Serial No. 255,870, filed November 10, 1951, now Patent No. 2,722,887, to which reference may be had for a full disclosure of mechanism which is not pertinent to the present invention, and which for that reason will be described only in a general way herein.

Machine framework

The machine chosen to illustrate the present invention is similar in appearance to the machine disclosed in FIG. 1 of the co-pending application, Serial No. 255,870, now Patent No. 2,722,887, referred to above, and comprises a framework for supporting the mechanism of the machine, including a right frame 20 (FIG. 4) and a similar left frame (not shown), said main frames being secured in proper spaced apart relation to each other on a machine base plate in turn secured to the top surface of a drawer cabinet, in which is mounted a cash drawer. The base plate and drawer cabinet are not disclosed herein, but are similar to those disclosed in the application referred to above. The main frames are further secured in proper spaced-apart relation to each other by various cross frames, rods and bars, as is the usual practice.

Operating mechanism

Normally the machine is operated through the medium of a small electric motor (not shown), located in the back of the machine. However, a hand crank is provided for operating the machine under unusual conditions, such as the absence of electrical current.

Keyboard

The keyboard includes a cover plate 21 (FIG. 1) having a number of apertures therein, through which extend five rows of denominational amount keys 22 and one row of transaction keys 23. A key release lever 24, extending through an aperture in the plate 21 (FIG. 1) is provided to release any depressed amount or transaction keys, when necessary or desirable. The amount keys and the transaction keys are of flexible construction, whereby depression of an amount or transaction key releases any key previously depressed in the same row.

Figure 1:
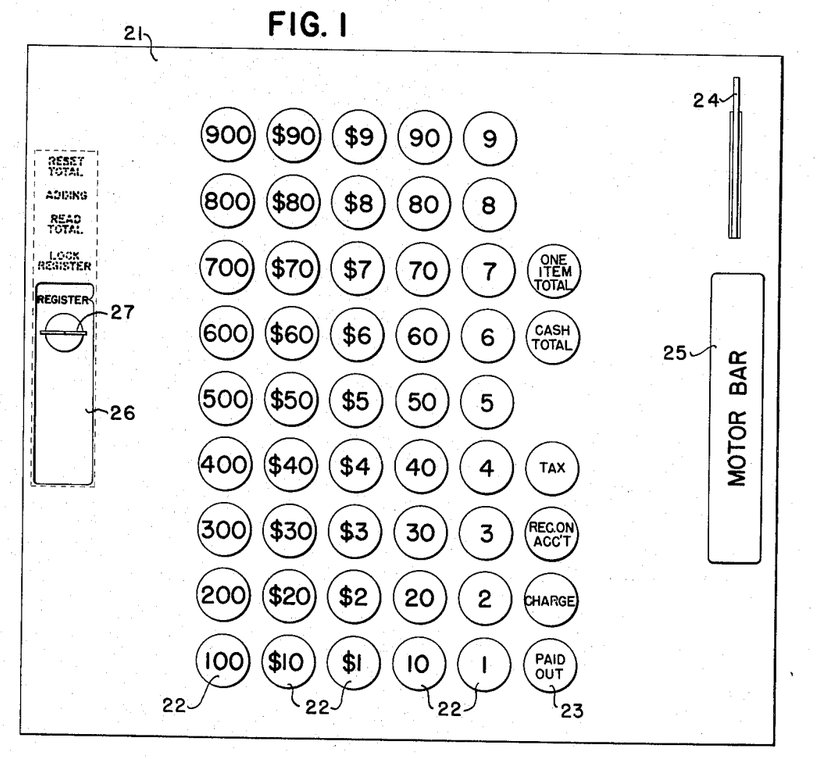
FIG. 1 is a diagrammatic view of the keyboard of the machine of this invention.

A motor bar 25, which extends through an aperture in plate 21, is provided for initiating machine operation.

A control slide 26 is movable to various positions to control Adding, Reading and Resetting functions, and also has a position in which the mechanism of the machine is locked against operation. The control slide is equipped with the usual lock and key 27, whereby the machine can be locked either in Register or Lock Register position to prevent Reading and Resetting operation of the machine by unauthorized persons in the first instance, or to prevent operation of the machine under any circumstances in the second instance.

Depression of the motor bar 25 to initiate machine operation locks the depressed amount and transaction keys against release, and also locks the undepressed keys against depression for the duration of machine operation. An automatic key release mechanism functions near the end of machine operation to release depressed amount keys 22 and depressed transaction keys 23.

Amount and transaction differential mechanisms

Each row of amount keys 22 (FIG. 1) is provided with differential mechanism of the type disclosed in the above cited patents for transmitting the values of the depressed amount keys to the corresponding indicators, type wheels and totalizer wheels. The row of transaction keys 23 (FIG. 1) is also provided with a differential mechanism similar to that provided for the amount keys for positioning type wheels and indicators corresponding to the transaction keys and for controlling certain functions of the totalizers, as will be explained presently. The differential mechanisms for the amount and transaction keys are fully disclosed in the above cited patents, and reference may be had thereto for a more complete description of these mechanisms.

Totalizers and totalizer engaging mechanism

The present machine is equipped with two totalizers (FIG. 4), an item totalizer 28 and a group totalizer 29, each comprising a totalizer gear wheel for each amount bank, for coacting with a corresponding amount actuator (a portion of one of which is shown at 31). The totalizer wheels 28 and 29 are mounted on a common axle or shaft 30, which is supported in the machine framework for axial or horizontal shifting movement to aline the different sets of totalizer wheels with the amount actuators, and said shaft is also supported for in-and-out shifting movement to engage and disengage the selected set of totalizer wheels with and from the amount actuators in proper timing for the type of operation being performed.

The mechanism employed in the present machine for imparting engaging and disengaging movement to the totalizers is similar to that disclosed in the above cited patents, and reference may be had thereto for a complete description of this mechanism.

Totalizer selecting and shifting mechanism

Figures 2, 3, 4, 5:
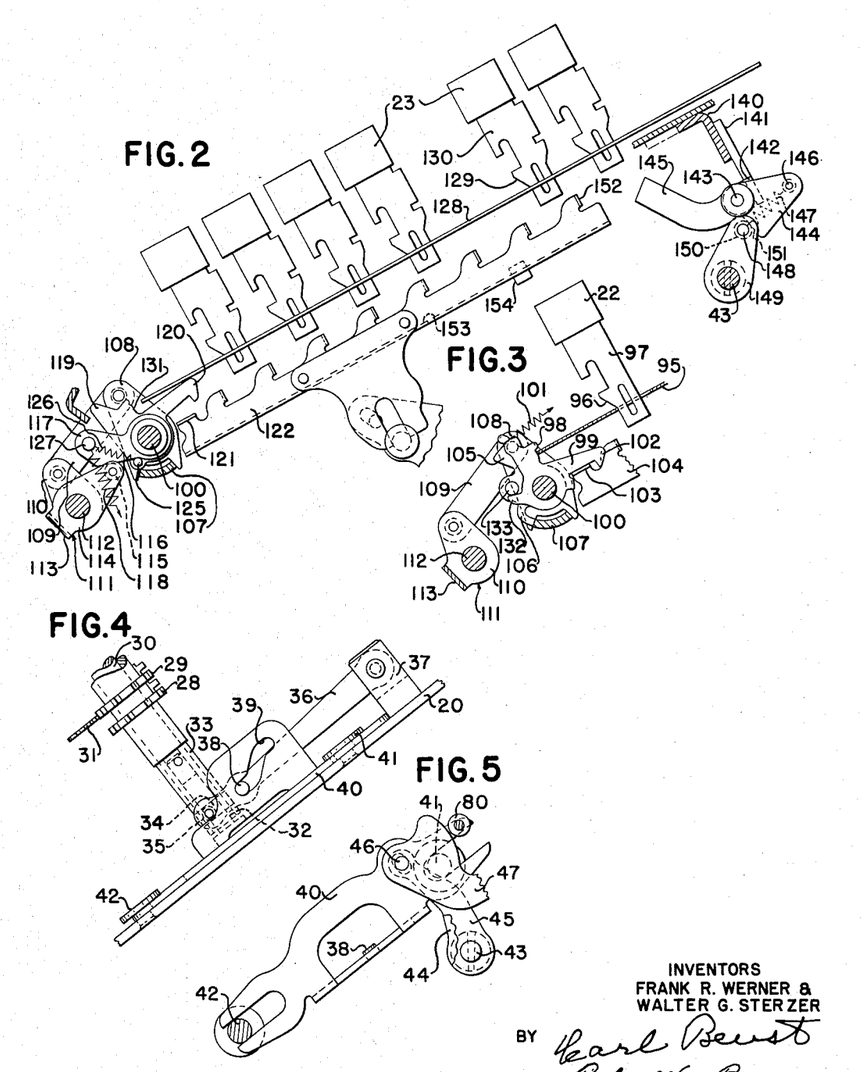
FIG. 2 is a detail side view of the bank of transaction keys, showing the transaction differential slide, the means for retaining said slide in "zero" position, and the means for interrupting movement of said slide for Sub-Total operation of the machine.
FIG. 3 is a fragmentary detail side view of a portion of one of the amount banks showing the zero stop pawl for that bank and a portion of the means actuated by depression of an amount key, which is operable to retain the transaction differential slide in "zero" position.
FIG. 4 is a top plan view of a portion of the totalizer shifting mechanism.
FIG. 5 is a detail side view of a portion of the totalizer shifting mechanism.

Means is provided for shifting the totalizers laterally to selectively control which totalizer is to be engaged with the amount actuators. This means is actuated under control of the control slide 26 and the transaction keys 23 (FIG. 1). Totalizer wheels 28 and 29, forming the item totalizer and the group totalizer, respectively, are rotatably mounted on the shaft 30 (FIG. 4), which is adapted to be shifted laterally to position the totalizer wheels of either of said totalizers in alinement with the amount actuators, one of which is shown fragmentarily at 31 in FIG. 4, preparatory to engaging said wheels with said actuators. Also pinned to the shaft 30 and slidably mounted on a trunnion 32 is a block 33 (FIG. 4). The block 33 is provided with a groove 34, which is engaged by a stud 35, carried by an arm 36, pivotally mounted in a slotted stud 37, carried by the frame 20. The arm 36 also carries a second stud 38, which coacts with an irregularly shaped cam slot 39 (FIG. 4) formed in a slide 40, which slide is bifurcated at its front and rear ends (FIGS. 4 and 5) to embrace studs 41 and 42 in the frame 20. When the arm 36 is in its normal position, as viewed in FIG. 4, the stud 38 will be located in the forward end of the slot 39. When in this position the arm 36, through the coaction of the stud 35 with the groove 34 and the block 33, positions the shaft 30 so that the totalizer wheels 29 of the group totalizer are in proper alinement for engagement with the amount actuators 31.

The slide 40 is adapted to be shifted forwardly under control of the control slide 26, and certain of the transaction keys 23, whereupon the arm 36, through the coaction of cam slot 39 with the stud 38 will be cammed in a clockwise direction. When this occurs, the stud 35, being in the groove 34, will shift the block 33 and shaft 30 toward the left to position the item totalizer wheels 28 in proper alinement for engagement with the amount actuators 31. The means for shifting the slide 40 will now be described.

Pinned to a shaft 43 (FIG. 5) journaled in the totalizer frame supporting plates (not shown), which plates are fastened to the side frames, is an arm 44, carrying a stud (not shown), which projects through an aperture in the slide 40. Also pinned to the shaft 43 is another arm 45, carrying a stud 46, by which a member 47 is pivotally connected to the arm 45. The member 47 normally rests on a stud 48 (FIG. 6) carried by the frame, and may be shifted from normal position as viewed in FIG. 5, toward the left, by means to be presently described, and through the train of mechanism above described, imparts a similar shifting movement to the slide 40. Such movement of the slide 40, as previously explained, results in the shifting of the shaft 30 to position the item totalizer wheels 28 in proper alinement for engagement with the amount actuators 31.

When the member 47 is shifted to the left to cause the item totalizer to be alined with the amount actuators 31, the lower surface of the member 47 will move beyond the stud 48, and the member 47 will, unless otherwise held elevated, drop in front of the stud 48 and lock the slide 40 in its forward position to maintain the item totalizer in alinement with the amount actuators 31. A stud 49 (FIG. 6), carried by the member 47, extends through a slot 50 in an arm 61, pivoted on stud 62, in the auxiliary frame (not shown) and enables this arm to control whether or not the member 47 will pivot about the stud 46 and also enables arm 61 to raise the member 47 from in front of the stud 48 to allow the member 47 to be shifted to the right to shift the item totalizer out of alinement with the actuators. The arm 61 is urged counterclockwise about stud 62 by means of spring 63, but the position of the arm 61 is controlled by a control segment 64, according to the transaction key 23 depressed.

Figures 6, 7, 8, 9:
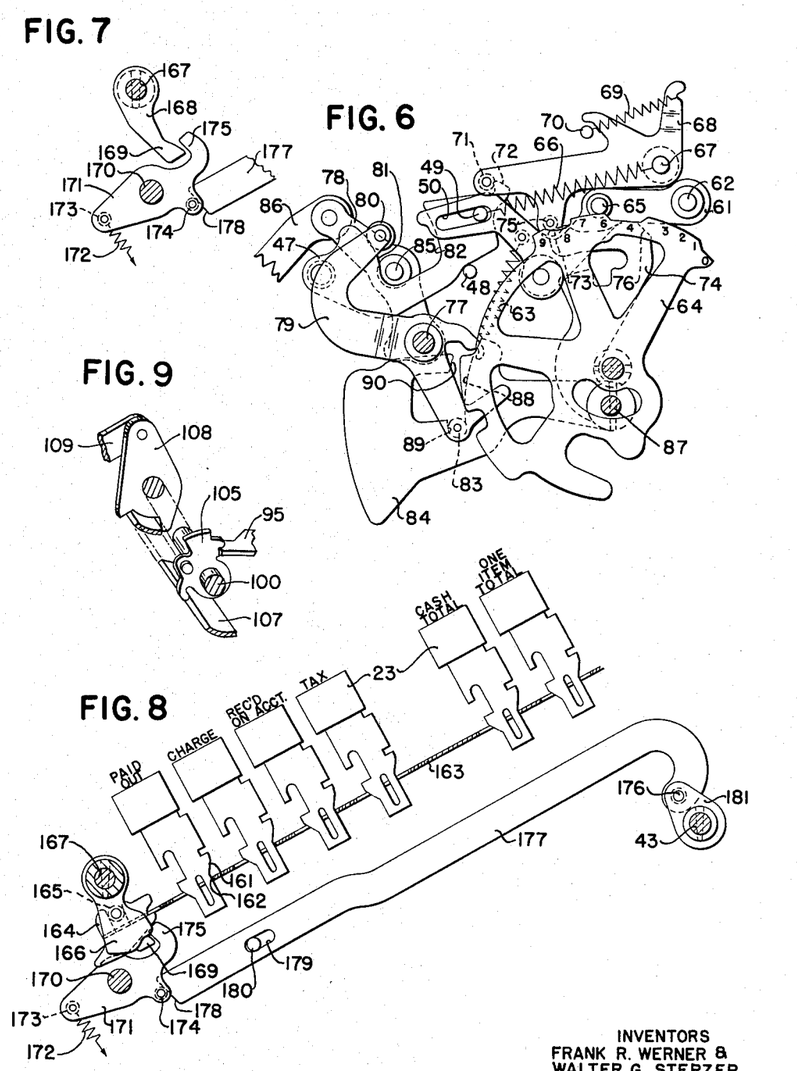
FIG. 6 is a detail side view of a portion of the totalizer shifting mechanism and of the selecting means for controlling the shifting of the totalizers.
FIG. 7 is a fragmentary detail side view showing a portion of the mechanism for locking certain of the transaction keys.
FIG. 8 is a detail side view of the bank of transaction keys, showing the locking detent in key-locking position and the means for retaining said detent in locking position.
FIG. 9 is a fragmentary perspective view showing certain details of FIGS. 2 and 3.

In the disclosed embodiment the arm 61 will be positioned in its upper position by the engagement of a stud 65 with the high portion of the periphery of the segment 64, which is positioned by the transaction differential mechanism. As shown in FIG. 6, the high portions are located in positions which are effective when the following transaction keys are depressed: Paid-Out (position 1), Charge (position 2), Received-on-Account (position 3), Cash Total (position 6), and One Item Total (position 7). In addition a high portion of the periphery of segment 64 is provided for a No Sale transaction (position 9). No transaction key is provided for this transaction; it being initiated by depression of the motor bar when the item totalizer is in a cleared or zeroized condition, as will presently be explained. A low portion of the periphery of segment 64 is located at a position which is effective when the Tax key (position 4) is depressed. In addition, low portions of the periphery of segment 64 are provided for Item (position 0) and Sub-Total (position 8) transactions. No transaction keys are provided for these transactions. An Item transaction is initiated by depressing amount keys corresponding to the amount of the item, and depressing the motor bar, as will be presently explained. A Sub-Total transaction is initiated by depressing the motor bar when the item totalizer is not in a cleared or zeroized condition, as will presently be explained.

A spring 66 (FIG. 6), which is fastened to stud 49 and to a stud 67 fastened to the auxiliary frame, urges the member 47 to the right to assist in restoring the member 47 in this direction.

Means is provided for normally latching the member 47 (FIGS. 5 and 6) against lefthand movement to aline the item totalizer with the actuators, said latching means being rendered ineffective by the control slide 26 when it is in Register or Adding position.

An arm 68 (FIG. 6) pivoted on the stud 67 is urged counter-clockwise by a spring 69 until a projection thereon engages a stud 70 on the auxiliary frame. A stud 71 on the arm 68 extends in front of a hook 72 on the member 47, and prevents any unintentional movement of said member 47 to the left. Arm 68 is rocked clockwise by high portion 73 of a control member 74, which portion 73 engages a stud 75 on the arm 68 when the control slide 26 is in Adding position. Arm 68 is similarly rocked clockwise by high portion 76 of member 74 when the control slide is in Register position. Control member 74 is pinned to shaft 87, which is differentially positioned by the control slide 26.

The means for shifting the member 47 to the left from its normal position and back to its normal position is shown in FIG. 6, and will now be described. Freely mounted on the stud 77, carried by the lower end of a lever 78, is a lever 79, which has on its upper end a stud 80, which is adapted to selectively engage vertical surfaces 81 and 82 on the member 47, to shift the member, respectively, to the left and to the right. The lever carries near its lower end a stud 83, which is adapted to coact with a control segment 84.

The lever 78 is pivotally mounted on a stud 85 on the main frame 20. During each operation of the machine, a pair of cams (not shown) are effective through a cam lever (not shown), and link 86 to impart to the lever 78 first a clockwise movement from its home or normal position, then a counter-clockwise movement past its home position, and movement back to its home position.

As the lever 78 partakes of these movements, the stud 77 in the lower end thereof will move to the left, then to the right, and finally back to the left, and will tend to move the lever 79 in these directions. If the stud 83 in the lower end of lever 79 is blocked against movement in either direction, the stud 77 will cause the lever 79 to pivot about the stud 83 and be effective through the engagement of stud 80 in the upper end of the lever 79 with the surfaces 81 and 82 on the member 47, to shift the member 47 and the slide 40 to the left and right. However, if the member 47 has previously been shifted to the left, and the rear end thereof has dropped down in front of the stud 48, this driving movement of lever 79 will be ineffective to further shift the member 47. If the stud 83 in the lower end of lever 79 is free to move, then the stud 77, in its movements to the left and right will cause the lever 79 to operate idly without imparting any shifting movement to the member 47. The blocking of the movement of stud 83 is effected by the control segment 84, which is set by the control slide 26.

Control segment 84 is pinned to shaft 87, which is differentially positioned by the control slide 26. A cutaway part of this control segment provides an arcuate surface 88 which blocks movement of the stud 83 to the right in all positions of the control segment, provides a surface 89 which blocks movement of stud 83 to the left when the control slide is in Register position, and also provides a control surface 90 which blocks movement of stud 83 to the left when the control slide is in Adding position.

It will be noted that in all operations, when the control slide 26 is in Register position, movement of stud 83 (FIG. 6) in both right and left directions is blocked by surfaces 88 and 89, respectively. Similarly, in all operations when the control slide 26 is in Adding position, movement of stud 83 in both right and left directions is blocked by surfaces 88 and 90, respectively. This results in both right and left movement of stud 80 in all such operations. However, in any operation in which it is desired to shift the member 47 to the left, to shift the item totalizer 28 into alinement with the amount actuators 31, arm 61 will, by contact of stud 65 thereon with a low portion of the periphery of control segment 64, permit member 47 to drop into a position such that stud 80 will not engage surface 82, and therefore will not shift member 47 during movement of stud 80 to the right. Also, it will be noted that in machine operation the stud 80 is shifted first to the left and then to the right, so that in any operation in which it is desired to shift the member 47 to the right to shift the group totalizers 29 into alinement with the amount actuators 31, the initial shifting of the member 47 to the left will not affect the final desired result, since arm 61 will, by contact of stud 65 thereon with the high portion of the periphery of control segment 64, retain member 47 in such position that the stud 80 in moving to the right after completing its leftward movement, will engage surface 82 of member 47, and shift the member 47 to the right.

The shifting of the totalizers to selectively aline either the item or group totalizer with the actuator segments 31 is therefore jointly controlled from the control slide 26 and the transaction keys 23, according to the particular operation performed.

*Automatic item transaction selection mechanism*

As has been stated, the present machine is equipped with both an item totalizer and a group totalizer. Novel means is provided for alining the item totalizer with the amount actuators automatically, when amount keys are depressed and the machine operated without depression of any of the keys in the transaction bank.

Each bank or denominational row of amount keys is provided with a plate 95 (FIGS. 3 and 9) which is slotted to cooperate with cam surfaces 96 on stems 97 of amount keys 22. The forward end of plate 95 underlies a rounded nose 98 on a zero stop pawl 99 free on the shaft 100 journaled in the main frames. Pawl 99 is normally urged in a clockwise direction by spring 101. A tooth 102 on the zero stop pawl 99 is adapted to coact with a bent-over ear 103 on a differential slide 104 to retain said slide in "zero" or normal position during machine operation, in the event no amount key in that bank is depressed. The forward end of plate 95 also underlies the rounded nose on a segment 105 free on the shaft 100. A finger 106 on segment 105 is adapted to coact with the bail of a yoke 107 (FIGS. 2 and 3) free on shaft 100. Also free on shaft 100, and constructed to embrace the bail of yoke 107 and to move with said yoke is an arm 108. Arm 108 is pivotally connected to one end of a link 109, which is pivotally connected at its other end to an arm 110 (FIG. 2) of a yoke 111, free on a shaft 112, which is journaled in the main frames. Yoke 111 also includes a bail 113 and an arm 114, offset approximately ninety degrees from the arm 110, to which link 109 is connected. Mounted on the arm 114 of yoke 111 is a stud 115 adapted to coact with a cam surface 116 on a segment 117 free on the shaft 100. Segment 117 is normally urged in a counter-clockwise direction by a spring 118. Free on shaft 100 is a zero stop pawl 119, having a tooth 120 which is adapted to coact with a bent-over ear 121 on a transaction differential slide or control member 122, to retain said slide in "zero" or normal position during machine operation in the event no key in the transaction bank is depressed. Mounted on pawl 119 is a stud 125, to which one end of a spring 126 is secured. The other end of spring 126 is secured to a stud 127 mounted on segment 117. There is thus provided a flexible connection between segment 117 and pawl 119, whereby pawl 119 will normally move with segment 117 when the segment is rocked in a clockwise direction. However, it will be noted that pawl 119 may move in a counter-clockwise direction independently of segment 117.

It will be seen that when an amount key is depressed in any amount bank, the plate 95 is shifted forwardly or to the left, as viewed in FIG. 3, releasing zero stop pawl 99 in the amount bank. The plate 95, in shifting forwardly, also rocks the segment 105 in a counter-clockwise direction. Finger 106 on segment 105 coacts with the bail of yoke 107, rocking the yoke counter-clockwise. When yoke 107 is rocked counter-clockwise, a counter-clockwise motion will be imparted to yoke 111 by link 109, and yoke 111, through arm 114 and stud 115, will in turn impart a clockwise motion to segment 117. Since pawl 119 is flexibly connected to segment 117, it also will be rocked clockwise, positioning tooth 120 in the path of ear 121 on slide 122.

When machine operation is initiated by depression of motor bar 25, retention of the transaction differential slide 122 in "zero" position causes control segment 64 (FIG. 6) to be positioned by the transaction differential mechanism with its "zero" position opposite stud 65. It will be recalled that there is a low portion on the periphery of control segment 64 at the "zero" position of its upper control surface. Positioning of this low portion opposite the stud 65 will permit the arm 61 to drop downwardly when member 47 is shifted to the left, and will cause the member 47 to be retained in this shifted position by the engagement of its rear edge with the stud 48. As previously explained, shifting of member 47 to the left positions the item totalizer in alinement with the amount actuators.

The transaction bank of keys is provided with a control plate 128 (FIG. 2) which is slotted to cooperate with cam surfaces 129 on stems 130 of the transaction keys 23. When a transaction key is depressed, the plate 128 will be moved forwardly or to the left, as viewed in FIG. 2, and will contact a surface 131 on pawl 119. Since the connection between pawl 119 and segment 117 is flexible, the pawl 119 may be rocked counter-clockwise by plate 128, to displace tooth 120 from the path of ear 121 of the slide 122, thus permitting movement of slide 122 upon machine operation, even though segment 117 has previously been rocked clockwise by stud 115 on arm 114.

Thus it will be seen that the automatic item transaction selection mechanism is rendered effective when amount keys are depressed, and is rendered ineffective by depression of any of the keys in the transaction bank.

Means is provided, effective near the end of each cycle of machine operation, to rock the tooth 120 of arm 119 (FIG. 2) out of the path of ear 121 on transaction differential slide 122, in the event that tooth 120 has been engaged with ear 121 during the operation. This includes mechanism not shown but fully disclosed in the above cited patent to Carey et al. (see particularly FIGS. 15, 39, and 40 of said patent) for releasing all depressed keys, which in turn permits plate 95 to return rearwardly a sufficient distance that spring 101 will urge zero stop pawl 99 in a clockwise direction into the path of ear 103 of amount differential slide 104. Clockwise movement of pawl 99 will be transmitted to segment 105 by means of a projection 132 on said pawl 99 coacting with a stud 133 on segment 105. Clockwise movement of segment 105 moves finger 106 out of engagement with yoke 107 and permits a spring (not shown) which is connected to yoke 107 and to the side frame 20 to rock said yoke in a clockwise direction. This motion is transmitted through link 109 and yoke 111 (FIGS. 2 and 3) to rock stud 115 in a clockwise direction out of contact with surface 116 of segment 117. Segment 117 is then free to be moved in a counter-clockwise direction by spring 118 and in thus moving, rocks tooth 120 of zero stop pawl 119 out of the path of ear 121 of transaction differential slide 122 by virtue of the coaction between cam surface 116 on segment 117 and stud 125 on pawl 119. Thus it will be seen that at the end of each cycle of machine operation tooth 120 of zero stop pawl 119 is moved out of coacting relationship with ear 121 of transaction differential slide 122.

Automatic sub-total mechanism

Novel means is herein provided for initiating a Sub-Total operation of the machine merely by depressing the motor bar when one or more item amounts have previously been entered into the machine.

Mounted on the keyboard assembly is a bracket 140 (FIG. 2) to which is secured a second bracket 141. A portion of bracket 141 is bent over to form an ear 142 in which is mounted a stud 143. A stop member 144 having a finger 145 is free on stud 143. A spring 147 extends between a stud 146 in the member 144 and a stud 148 in an arm 149, said arm being secured to shaft 43. Spring 147 thus provides a flexible connection between stop member 144 and arm 149. Free on stud 148 is a roller 150 adapted to coact with a cam surface 151 on stop member 144.

In machine operation, as has been previously explained, shaft 43 is rotated counter-clockwise by arm 45 (FIG. 5) whenever the item totalizer is shifted into alinement with the amount actuators. Arm 149, being secured to shaft 43, rotates counter-clockwise with said shaft. Due to the spring connection 147 between arm 149 and stop member 144, stop member 144 is rotated clockwise upon counter-clockwise rotation of shaft 43, thus positioning finger 145 in the path of an ear 152 on the transaction differential slide 122.

Therefore when item amounts have previously been entered in the machine, and a sub-total of these amounts is desired, motor bar 25 is depressed. Upon initiation of machine operation by depression of the motor bar, the transaction differential slide 122 is moved rearwardly or to the right as viewed in FIG. 2, until ear 152 engages finger 145, the tooth 120 having been rocked out of the path of ear 121 of the transaction differential slide 122 near the end of the previous machine operation, as has been previously explained. This movement of the transaction differential slide causes the transaction differential mechanism to position control segment 64 (FIG. 6) so that a low portion of the periphery (position 8) is opposite stud 65 of arm 61 and thus conditions the machine for a Sub-Total operation.

Finger 145 will remain in position to engage ear 152 on transaction differential slide 122 so long as the item totalizer 28 is alined with the amount actuators 31. Upon shifting of the item totalizer out of alinement with the amount actuators, shaft 43 will be rotated clockwise. Clockwise rotation of shaft 43 and therefore of arm 149, causes roller 150 to engage cam surface 151 on stop member 144 to rock said stop member counter-clockwise, which moves finger 145 out of the path of ear 152 on transaction differential slide 122.

Automatic no sale mechanism

Novel means is herein provided for initiating a No Sale operation merely by depressing the motor bar when the machine has been conditioned by its previous operation so that the group totalizer is in alinement with the amount actuators.

In a No Sale transaction, the transaction differential slide 122 travels full distance rearwardly, or to the right as viewed in FIGS. 2 to 9, or No Sale position. This position is determined by a projection 153 on the transaction differential slide 122 coming in contact with a square stud 154. Stud 154 is mounted on a partition plate (not shown) positioned between the transaction differential slide 122 and the amount differential slide immediately adjacent it.

Upon initiation of machine operation, by depression of the motor bar 25, the transaction differential slide 122 is moved rearwardly or to the right as viewed in FIG. 2 until projection 153 engages stud 154. This movement of the slide 122 causes the transaction differential mechanism to position control segment 64 (FIG. 6) so that a high portion of the periphery (position 9) is opposite stud 65 of arm 61 and conditions the machine for a No Sale operation.

It will be seen that in order for a No Sale operation to take place upon depression of the motor bar 25, the transaction differential slide 122 must be free to move to the full extent of its travel. Therefore no amount keys 22 may be depressed, since, as previously explained, this would move tooth 120 of stop pawl 119 (FIG. 2) into the path of ear 121 of slide 122 and thereby retain the slide 122 against movement. Similarly no transaction key 23 may be depressed since depression of any of these keys will move the lower end of key stem 130 of the depressed key into the path of its respective ear on the slide 122 and thus prevent the slide from moving to the full extent of its travel. Lastly the previous operation of the machine must have been one in which the group totalizer 29 rather than the item totalizer 28, was shifted into or remained in alinement with the amount actuators 31, since, as previously explained, when the item totalizer 28 is in alinement with the amount actuators 31, the finger 145 (FIG. 2) of stop member 144 is positioned in the path of ear 152 of slide 122, to prevent slide 122 from moving past 8, or Sub-Total, position.

*Locking means for certain of the transaction keys*

Novel means is herein provided for locking certain of the keys in the transaction bank, namely the Paid Out, Charge, Received on Account and Cash Total keys, against depression except when the item totalizer has been shifted into alinement with the amount actuators.

The stem of each of the Paid Out, Charge, Received on Account and Cash Total keys in the transaction bank has a cam surface 161 (FIG. 8) which is adapted to cooperate with a surface 162 of a slot in a detent 163 mounted in the transaction key row. At its forward end, detent 163 is provided with a hook 164 which engages a stud 165 mounted on an arm 166 which is secured to a shaft 167, said shaft being mounted in and extending between the machine side frame members.

It will be seen that upon depression of any of the Paid Out, Charge, Received on Account or Cash Total keys, detent 163 will be moved rearwardly, or to the right as viewed in FIG. 8, and will cause the rocking of shaft 167 in a counter-clockwise direction. It will also be seen that a blocking of counter-clockwise rotation of shaft 167 will prevent depression of the Paid Out, Charge, Received on Account and Cash Total keys by preventing rearward movement of detent 163.

Secured on the left end of the shaft 167 adjacent to the left side frame (not shown) is an arm 168 (FIG. 7), having a downwardly extending finger 169 (FIGS. 7 and 8). The finger 169 coacts with a hook 175 on a lever 171 free on a stud 170 in the left side frame member. A spring 172, one end of which is secured to a stud 173 mounted in the lever 171, and the other end of which is secured to the left side frame member, urges said lever 171 counter-clockwise to normally maintain a stud 174 carried thereby in yielding engagement with the forward end 178 of a link 177. This positions the hook 175 of lever 171, as shown here, to block counter-clockwise rocking of arm 168 and shaft 167 which, as previously explained, obstructs depression of the Paid Out, Charge, Received on Account and Cash Total keys.

The hook-shaped rearward end of the link 177 is free on a stud 176 in an arm 181 mounted on the shaft 43 (FIG. 8) adjacent the left side frame. Link 177 is mounted for guided reciprocating movement by means of a slot 179 which cooperates with a stud 180 mounted on the left side frame. A head (not shown) on the stud 180 retains link 177 in its required plane of motion.

It will be recalled that shaft 43 (FIG. 5) has secured thereto the arm 45, which arm is connected to member 47 of the totalizer shifting means. When the item totalizer 28 is shifted into alinement with the amount actuators 31, shaft 43 will be rocked counter-clockwise by arm 45. Counter-clockwise rocking of shaft 43 and of arm 181 (FIG. 8) will shift link 177 forwardly, or to the left as viewed in FIG. 8, causing the surface 178 to engage the stud 174, and rock the lever 171 in a clockwise direction. This moves hook 175 of lever 171 out of blocking relationship with finger 169 of arm 168. Therefore, as long as the item totalizer 28 remains in alinement with the amount actuators 31, surface 178 of link 177 will retain lever 171 in a position wherein hook 175 of said lever does not block counter-clockwise rocking of shaft 167. Thus it is evident that the Paid Out, Charge, Received on Account and Cash Total keys are blocked against depression by coaction of the finger 169 and the hook 175 at all times, except when the item totalizer 28 is in alinement with the amount actuators 31.

In addition to the above described locking means, an interlock is provided between amount keys 22 and Paid Out, Charge, Received on Account and Cash Total transaction keys, whereby when any amount key 22 is depressed, the aforementioned transaction keys are locked against depression, and conversely when any of the aforementioned transaction keys have been depressed, the amount keys are locked against depression. This interlock is of the same type as the interlock disclosed in the patent cited above to Carey et al. which acts in that patent to lock the Total, Sub-Total or No Sale keys against depression, if amount keys are depressed, and conversely acts to lock the amount keys against depression if the Total, Sub-Total or No Sale keys are depressed. This interlock is shown particularly in FIG. 38 of the above cited patent.

The means described above for locking the Paid Out, Charge, Received on Account and Cash Total keys against depression before an item has been entered in the item totalizer and for providing a mutual interlock between the keys in the amount banks and the Paid Out, Charge, Received on Account and Cash Total keys find utility in the nature of the particular transactions which the machine is designed by this arrangement to record and indicate.

It often occurs in an establishment of the type for which this machine is suitable that the owner or salesperson will be presented with a bill for goods supplied to the establishment or services rendered to it and will desire to pay this bill at the time it is presented. Such bills normally comprise a number of items, and it is desirable that the owner or salesperson be able to total these items to make certain that the total indicated on the bill is correct. This may be conveniently done with the present machine. Each item is entered in the machine by the usual machine operation during which it is indicated by the indicators, printed on the record strip by the type wheel, and entered into the item totalizer. When all of the items have been entered, the machine is operated with the Paid Out transaction key depressed. This causes the machine to indicate and print the total of these items as a Paid Out transaction. This total will be cleared from the item totalizer but will not be entered into the the group totalizer since it does not represent an amount received.

A similar procedure is followed if it is desired to list a series of items which are to be charged. In this instance when all of the items have been entered the machine is operated with the Charge transaction key depressed. This causes the machine to indicate and print the total of these items as a Charge transaction. As in the case of a Paid Out transaction this total will be cleared from the item totalizer but will not be entered into the group totalizer since it does not represent an amount received.

In the case of a Received on Account transaction, a similar procedure is followed to cause the machine to indicate and print the total of items entered as a Received on Account transaction. In this case however, when the item totalizer is cleared the total is transferred to the group totalizer since this total represents an actual amount received.

The sequence of operations in a Cash Total operation is similar to that in a Received on Account transaction.

It will therefore be seen that the Paid Out, Charge and Received on Account keys as well as the Cash Total key effect total-taking operations. For this reason the mutual interlock between the amount keys and the Paid Out, Charge, Received on Account and Cash Total keys is provided so that no amount keys can be depressed when a total is being taken and so that these transaction keys cannot be depressed in conjunction with amount keys. The locking means which prevents the depression of these transaction keys, except when an amount has previously been entered in the machine, is provided to insure that said keys will not be employed by an operator merely to cause opening of the cash drawer since such an operation is properly a No Sale transaction and should be indicated as such.

While the form of mechanism herein shown and described is admirably adapted to fulfill the objects primarily stated, it is to be understood that it is not intended to confine the invention to the one form or embodiment herein disclosed, for it is susceptible of embodiment in various other forms, all coming within the scope and spirit of this invention.

What is claimed is:

1. In a machine of the class described, capable of several types of operations, said machine having amount keys and actuators adapted to be positioned under influence of the amount keys upon machine operation, the combination of an item totalizer and a group totalizer; means to selectively shift the item totalizer or the group totalizer into alinement with the actuators; an arm connected to the selective shifting means; a shaft, said shaft and said arm being secured together; a second arm secured on said shaft; a control member movable from home position to one of several different positions for controlling the type of operation of the machine according to its position; a stop member having a finger which in one position is in the path of movement of the control member and coacts therewith to determine the position of the control member to control one type of operation of the machine, and which finger in another position is out of the path of movement of the control member to control another type of operation of the machine; a flexible connection between said second arm and said stop member; a cam surface on said stop member; and means on said second arm to coact with said cam surface, whereby rotation of the second arm in one direction causes movement of the stop member, through the flexible connection, such as to position the finger of the stop member in the path of movement of the control member, and whereby movement of the second arm in the opposite direction causes movement of the stop member such as to position the finger of the stop member out of the path of movement of the control member.

2. In a machine of the class described, capable of several types of operations, said machine having amount keys and actuators adapted to be positioned under influence of the amount keys upon machine operation, the combination of an item totalizer and a group totalizer; means to selectively shift the item totalizer or the group totalizer into alinement with the actuators; a control member movable from home position to one of several different positions for controlling the type of operation of the machine according to its position; a stop member which in a first position is in the path of movement of the control member and coacts therewith to determine the position of the control member to control the type of operation of the machine, and which in a second position is out of the path of movement of the control member; and means connected to said shifting means, adapted to move the stop member from said second position to said first position when the shifting means shifts the item totalizer into alinement with the actuators, and adapted to move the stop member from said first position to said second position when the shifting means shifts the group totalizer into alinement with the actuators.

3. In a machine of the class described, capable of several types of operations, said machine having amount keys and actuators adapted to be positioned under influence of the amount keys upon machine operation, the combination of an item totalizer and a group totalizer; means to selectively shift the item totalizer or the group totalizer into alinement with the actuators; a control member movable from home position to one of several different positions for controlling the type of operation of the machine according to its position; a stop member which in a first position is in the path of movement of the control member and coacts therewith to determine the position of the control member to control one type of operation of the machine, and which in a second position is out of the path of movement of the control member; and means connected to said shifting means, adapted to move the stop member from said second position to said first position when the shifting means shifts the item totalizer into engagement with the actuators, and adapted to move the stop member from said first position to said second position when the shifting means shifts the group totalizer into alinement with the actuators, said control member, when free to move past said stop member, being adapted to condition the machine for another type of operation of the machine.

4. In a machine of the class described, capable of several types of operations, said machine having a plurality of banks of amount keys, and actuators adapted to be positioned under influence of the amount keys upon machine operation, the combination of an item totalizer and a group totalizer; means to selectively shift the item totalizer or the group totalizer into alinement with the actuators; a bank of transaction keys; detent means adapted when in one position to retain certain of said transaction keys against depression; a first shaft extending along one end of the amount banks and the transaction bank; an arm secured on said first shaft opposite the transaction bank, and pivotally connected to one end of said detent means; a second arm secured on said first shaft; a lever having a portion normally interposed in the path of movement of said second arm to prevent rotation of said second arm, said shaft, and said first arm, and thus prevent movement of said detent means out of key-retaining position, said lever having a stud on one end thereof; a second shaft; an arm connected to said shifting means and secured on said second shaft; a second arm secured on said second shaft; a link pivotally connected to said second arm on said second shaft; and means to guide said link in reciprocating movement, said link having an end portion thereof adapted to engage said stud on said lever, and rock said lever to move said portion thereon out of the path of movement of said second arm on said first shaft upon shifting movement of the shifting means, thus permitting movement of the detent means out of key-retaining position.

5. In a machine of the class described, capable of several types of operations, said machine having a plurality of banks of amount keys and actuators adapted to be positioned under influence of the amount keys upon machine operation, the combination of an item totalizer and a group totalizer; means to shift the item totalizer into alinement with the amount actuators upon depression of one or more amount keys and operation of the machine; a bank of transaction keys; means to lock certain of said transaction keys against depression; and means to release said locking means upon shifting of the item totalizer into alinement with the amount actuators.

6. In a machine of the class described, capable of several types of operations, said machine having a plurality of banks of amount keys, and actuators adapted to be positioned under influence of the amount keys upon machine operation, the combination of a plurality of totalizers; means to selectively shift one of the totalizers into alinement with the actuators; a bank of transaction keys; detent means adapted when in one position to retain certain of said transaction keys against depression; a shaft extending along one end of the amount banks and the transaction bank; a first arm secured on said shaft, opposite the transaction bank, and pivotally connected to one end of said detent means; a second arm secured on said shaft; a lever having a portion normally interposed in the path of movement of said second arm to prevent rotation of said second arm, said shaft, and said first arm, and thus prevent movement of said detent means out of key-retaining position, said lever also having a stud on one end thereof; a link having an end portion thereof adapted to engage said stud on said lever; and means to connect said shifting means to said link to shift said link upon shifting movement of the shifting means so that said end portion of said link rocks said lever to move said portion of said lever out of the path of movement of said second arm on said shaft thus permitting movement of the detent means out of key-retaining position.

7. In a machine of the class described, capable of several types of operations, said machine having amount keys and amount actuators adapted to be positioned under influence of said amount keys upon machine operation, the combination of an item totalizer and a group totalizer; means to selectively shift the totalizers to position one of said totalizers in alinement with the amount actuators; a control member movable from home position to one of several different positions for controlling the type of machine operation according to its position; and stop means operates by the totalizer shifting means and coacting with the control member to cause one type of automatic machine operation to be performed when the item totalizer is alined with the actuators by said shifting means, and to cause another type of automatic machine operation to be performed when the group totalizer is alined with said actuators by said shifting means.

8. In a machine of the class described, having an item totalizer, a group totalizer, and amount actuators for the totalizers, the combination of depressible amount keys to control the positioning of the amount actuators; depressible transaction keys; a differential slide controllable by the amount keys or by the transaction keys; means including a segment controlled by the slide to aline the totalizer corresponding to the depressed amount key or the depressed transaction key with the amount actuators; a projection on the slide; a yieldable pawl arranged to engage the projection but normally disengaged therefrom; means operated by an amount key when depressed to move the pawl into engagement with the projection to control the slide and the segment to cause the item totalizer to be alined with the amount actuators; and means operated by a transaction key when depressed to move the pawl out of engagement with the projection to cause the slide and the segment to be controlled by said depressed transaction key to aline the corresponding totalizer with the amount actuators.

9. In a machine of the class described, having two totalizers, and amount actuators for the totalizers, the combination of depressible amount keys to control the actuators; depressible transaction keys; a totalizer-selecting slide controllable by the amount keys or by the transaction keys; means including a segment controlled by the slide to aline the totalizer corresponding to the depressed transaction key with the amount actuators; a projection on the slide; a pawl constructed and arranged to engage the projection; an arm flexibly connected to the pawl; yieldable means normally effective to retain the pawl out of engagement with the projection; means including a first yoke operable by an amount key when depressed and a second yoke operable by the first yoke and coacting with the arm to move the pawl into engagement with the projection to control the slide and the segment to cause a particular one of the totalizers to be alined with the amount actuators; and means operated by a transaction key when depressed and coacting with the pawl to move said pawl out of engagement with the projection to cause the slide and the segment to be controlled accordingly to aline the totalizer corresponding to said depressed transaction key with the amount actuators.

10. In a machine of the class described, having an item totalizer, a group totalizer, and amount actuators for the totalizers, the combination of depressible amount keys to control the positioning of the amount actuators; depressible transaction keys; a transaction differential slide, said slide movable during machine operation, under control of the depressed transaction key from home position to a position corresponding to said depressed transaction key; means including a segment controlled by the slide to aline the totalizer corresponding to the depressed transaction key, with the amount actuators; a projection on the slide; a yieldable pawl arranged to engage the projection, but normally disengaged therefrom; means operable by an amount key when depressed to move the pawl into engagement with the projection to retain the slide in home position to control the segment accordingly, to cause the item totalizer to be alined with the amount actuators; and means operated by a transaction key, when depressed, to move the pawl out of engagement with the projection to cause the slide and the segment to be positioned by said depressed transaction key to aline the corresponding totalizer with the amount actuators.

References Cited in the file of this patent
UNITED STATES PATENTS

| | | |
|---|---|---|
| 2,443,652 | Carey et al. | June 22, 1948 |
| 2,450,165 | Randall et al. | Sept. 28, 1948 |
| 2,698,139 | Goodbar et al. | Dec. 28, 1954 |
| 2,721,695 | Butler et al. | Oct. 25, 1955 |

UNITED STATES PATENT OFFICE

CERTIFICATE OF CORRECTION

Patent No. 3,001,695                                         September 26, 1961

Frank R. Werner et al.

It is hereby certified that error appears in the above numbered patent requiring correction and that the said Letters Patent should read as corrected below.

Column 2, lines 55 and 56, for "exend" read -- extend --; column 4, line 37, after "on" insert -- a --; column 10, line 56, for "wheel" read -- wheels --; column 13, line 37, for "operates" read -- operated --.

Signed and sealed this 27th day of February 1962.

(SEAL)
Attest:

ERNEST W. SWIDER
Attesting Officer

DAVID L. LADD
Commissioner of Patents